Patented Nov. 19, 1940

2,222,509

UNITED STATES PATENT OFFICE 2,222,509

LUMINESCENT MATERIAL

Sampson Isenberg, Chicago, Ill., assignor to General Luminescent Corporation, Chicago, Ill., a corporation of Illinois No Drawing. Application October 7, 1940,
Serial No. 360,169

6 Claims. (Cl. 250—81)

My invention relates to ground luminescent materials and methods of producing the same, and more particularly to luminescent materials of the Willemite type.

Large numbers of materials which exhibit luminescence when in the presence of exciting rays, such as relatively short electro-magnetic waves, have been known for many years. Comparatively recently, interest in luminescent materials, and the synthetic manufacture and uses thereof, has attracted attention due to the commercial application of such materials to surfaces exposed to exciting waves, such as those produced by mercury discharge tubes.

Despite the relatively large amount of development work looking toward improvement in luminescent materials, and averments made with respect to superior results obtained by certain treatments, in general, investigators have not given sufficient consideration to all of the conditions which may surround the preparation and use of these materials. The source and character of the exciting radiation is of considerable importance and a material which is eminently satisfactory under one set of conditions may not be satisfactory under conditions where the exciting ray is not the same in either its character or intensity.

My invention is particularly concerned with luminescent materials adapted to be coated onto the inside surface of space discharge tubes, primarily mercury discharge tubes, such as the mercury-argon, mercury-krypton or similar tubes used for advertising or lighting purposes.

Luminescent materials may be produced, so that when merely crushed, but not ground, they will pass a 200 mesh screen. While unground material of this general mesh size may be used, and has been extensively used, in tube coating operations, much better results may, in general, be obtained with a finer mesh material. While a finely ground material may be suitable for many purposes, it is not satisfactory for excitation in a mercury discharge tube, because of the marked loss of brilliancy which occurs on grinding. Various attempts have been made to meet this problem, but, in general, the means employed have resulted in introducing new problems, it being kept in mind that it has always been the desideratum to produce as efficient a tube as possible, and, therefore, to employ a luminescent material exhibiting the maximum brilliancy.

The principal object of my invention is the production of improved ground luminescent materials of the Willemite type.

Other objects of my invention will be clear from the following specification:

I have found that, when producing a luminescent material of the synthetic Willemite type, that is, an orthosilicate type of material employing manganese as an activator, the proportion of activator employed is important not only with respect to the exciting source to which the material is to be exposed, but also with respect to the treatment which it is to undergo. More specifically, in the production of a ground manganese-activated orthosilicate, I have found that the proportion of activator should be greater than that which will produce maximum brilliancy in the same matrix material, if unground and exposed to the same exciting source.

In general, in carrying out my invention, I may, for example, employ stoichiometric proportions of materials which, on reaction, will produce the orthosilicate. Together with these materials, I employ manganese as an activator, in proper proportions as hereinafter described. The manganese may be introduced as a salt of manganous acid, or in other suitable form.

The materials generally referred to in the preceding paragraph are placed together and ground in a ball mill for from about two to about twenty-four hours, depending upon the particle size of the introduced materials. In general, but only by way of illustration, I prefer to run a five-gallon ball mill about fifty revolutions per minute. This procedure produces highly satisfactory results. By way of example, if the starting materials introduced into the ball mill are approximately 300 mesh and the ball mill is operated at about 50 revolutions per minute, approximately two hours grinding will suffice.

One of the important features of the grinding is to obtain an intimate mixture of the constituents. I find that when I employ a compound of manganese which is colored, for example, a permanganate, as one of the sources of manganese, considerable assistance is afforded by visual inspection of the color distribution in checking the character of mixture obtained due to the ball milling. A desirable source of manganese is a mixture of manganous chloride and zinc permanganate, a mixture comprising approximately 5% of the latter and 95% of the former producing adequate color for my purpose.

After the materials in propor proportion to produce the activated luminescent material have been ball milled, the resulting mixture is placed in a crucible which is not affected by the reacting materials, such as, for example, a fire clay or platinum crucible. The crucible is then introduced into a furnace where uniform temperature and freedom from contamination are substantially assured, such as, for example, an electric furnace, and heated for from about two to about five hours at a temperature in excess of about 1000 degrees C. but preferably not appreciably above 1200 degrees C. The temperature, the proportion of material heated, and its distribution in the furnace are factors to be taken into consideration in determining the time of heating.

In order that those skilled in the art may understand more fully the features of my present invention and know how to practice the same, I disclose below some illustrative examples thereof.

*Example 1.*—6 pounds of zinc oxide, 3 pounds of silicic acid and 12.7 ounces of manganous chloride ($MnCl_2.4H_2O$) are mixed together. These materials, as selected, are preferably in the form of fine powders, fine enough, for example, to pass a 300 mesh screen. The mixture is introduced into a ball mill, and the ball mill is operated until thorough mixing of the finely divided starting materials has been accomplished. Two to three hours is usually an adequate amount of time. The mixture of materials so obtained is then introduced into fire-clay crucibles and fired to reaction. With these particular starting materials, a temperature of 1220 degrees C. is suitable and the time for firing is about three to four hours or slightly longer. A sintered reaction product is obtained which is readily broken up by a simple crushing operation.

When the crucibles have cooled, the reaction product is then crushed and passed through a 200-mesh screen. This product I term an unground product, since it is readily broken up, in many instances even with the fingers. This material may then be ground, particularly in a ball mill, to produce a very finely divided material suitable for coating tubes by various methods. The material, ground to 400 mesh or finer, comprises an excellent coating material for mercury-argon tubes.

The product so produced contains about 2½% manganese as an activator. This product, as initially produced, that is, prior to being ground or ball milled, in general, produces a considerably less brilliant light when coated onto the inside surface of a mercury-argon tube than does a material comprising the identical matrix material but containing only about 1¼% manganese. On grinding, however, the material produced in accordance with the example suffers only very slight loss of brilliancy, whereas the identical matrix material, with less activator, suffers a marked loss of brilliancy on prolonged grinding.

*Example 2.*—Seven pounds and two ounces of zinc oxide, 3 pounds and 13 ounces of silicic acid, one pound of manganous chloride, and 2.3 ounces of beryllium oxide, all in the form of fine powders of about 300 mesh, are ball milled for about three hours, and the resulting mixture heated to reaction in fire clay crucibles for four hours at 1150 degrees C. On cooling, the material produced is crushed and passed through a 200-mesh screen. The 200 mesh material is then ball milled to 400 mesh or finer, and a brilliant commercially very desirable material is produced. The same matrix material, activated with less manganese, however, while initially (in the unground state) of greater brilliancy than the material of the example, will suffer a marked loss of brilliancy when subjected to prolonged grinding.

Thus it will be seen that I have produced an improved, finely ground luminescent material of the Willemite or orthosilicate type, at least fine enough to pass a 400-mesh screen, and having very much greater brilliancy than a ground material comprising the same matrix but containing less manganese. The material of my invention preferably contains at least about 1.75% manganese, and may contain as much as about 5% manganese, depending upon the source and character of the exciting radiation by means of which it will be excited. By employing suitable starting materials and firing at a temperature and for sufficient time to bring about a reaction, specifically above approximately 1000 degrees C. but not appreciably above 1200 or 1250 degrees C., I produce a material which is readily crushed to 200-mesh without grinding, and then ground to at least 400-mesh without appreciable loss of brilliancy.

The manganese employed is calculated on the basis of the metal in all of the percentages given. The exact form of the manganese in the final product is not fully known, but there is probably a mixture of various forms. When I refer in the claims to the amounts of manganese present, therefore, I contemplate the total amount thereof calculated as the free metal, based on the weight of the luminescent material as a whole.

The luminescent material may be ball milled with other substances, such as binders, to prepare a mixture for application to a tube. The relationship of the percentage of manganese to grinding is a factor so far as all modifications of Willemite types of materials are concerned. The preferred or optimum range of manganese should be increased by between about 25% and 75% depending upon the extent to which the product is to be ball milled or ground after its production. For use in a mercury-argon tube, for example, I prefer to employ as a standard procedure from about 1.75% to about 2.5% of manganese as an activator, and preferably between about 2% and 2.5%.

When a 1.25% manganese product is produced, it will have a measurable brilliancy somewhat greater than a 2.5% manganese product. When the 1.25% product is ball milled extensively, however, it suffers a marked loss of brilliancy, and its light as emitted shifts slightly toward the violet end of the spectrum. The 2.5% manganese product, on the other hand, does not suffer appreciable loss of brilliancy after extensive ball milling.

As an example, to illustrate the brightness relationship under the various conditions discussed, the case of a green Willemite may be considered. By actual test, I have found that a zinc orthosilicate activated with about 1.5% of manganese, if unground, may have a relative output of 100, but, when ground to —400 mesh, may decrease in light output under the same conditions to 55. On the other hand, the same matrix material activated with 2.5% manganese may initially, in the unground state, have a brightness value of 90, but, after being ground to 400 mesh, will still show a brightness value of 82. The conditions of measurement were in each instance the same.

The results obtainable by the practice of my invention hold true whether the basis of calculation be with reference to percentage by weight or calculations of molar ratios. When the molecular weight of the matrix material is heavy, the actual weight percentage of manganese may be decreased. To produce a ground Willemite type of material in accordance with my invention for excitation by a mercury-argon mixture, I find that good results are obtained when the molar proportion of manganese is .102 moles per mole of matrix material, whereas, in general, .06 moles of manganese or somewhat less produces the greatest brightness in the unground state.

I have described my invention in considerable detail so that those skilled in the art may understand and practice the same. The invention is limited, however, only by the scope of the appended claims.

This application is a continuation-in-part of my prior application, Serial No. 260,893, filed March 10, 1939.

What I claim as new and desire to protect by Letters Patent of the United States is:

1. A finely divided luminescent material of the Willemite type ground to fine size after the production thereof, said material comprising an orthosilicate activated with at least 1.75% of manganese, calculated as the metal, and being at least of sufficient fineness to pass a 400 mesh screen, said material having its brilliancy, when applied to a mercury discharge type, substantially unimpaired by the grinding operation required to produce a fine state of subdivision.

2. A finely divided luminescent material of the Willemite type ground to fine size after the production thereof, said material comprising an orthosilicate activated with from about 1.75% to about 5% of manganese, calculated as the metal, and being at least of sufficient fineness to pass a 400 mesh screen, said material having its brilliancy, when applied to a mercury discharge tube, substantially unimpaired by the grinding operation required to produce a fine state of subdivision.

3. A finely divided luminescent material of the Willemite type ground to a fine size after the production thereof, said material comprising an orthosilicate activated with from about 2% to about 2½% of manganese, calculated as the metal, and being at least of sufficient fineness to pass a 400 mesh screen, said material having its brilliancy, when applied to a mercury discharge tube, substantially unimpaired by the grinding operation required to produce a fine state of subdivision.

4. The method of producing a luminescent material of the Willemite type for activation by an exciting radiation in a luminous discharge tube which comprising mixing together, in finely divided form, proportions of materials which on firing will produce said Willemite type of material, and a proportion of manganese 25% to 75% greater than that proportion determined to be necessary to produce maximum brilliancy when the final material in an unground state is subjected to said exciting radiation under the same conditions, heating the mixture at a temperature above 1000 degrees C. but not appreciably above 1200 degrees C. and from two to five hours to produce a luminescent material, crushing the resulting material enough to pass it through a 200 mesh screen and then grinding the material until it will pass a 400 mesh screen, the presence of the greater amount of manganese than necessary to produce maximum brilliancy in an unground material under the same conditions serving to prevent appreciable loss of brilliancy and change in luminescent tone quality during grinding.

5. The method of producing a luminescent material of the Willemite type for activation by an exciting radiation of a luminous discharge tube which comprises mixing together proportions of reacting materials which on firing will produce zinc orthosilicate, and a proportion of manganese 25% to 75% greater than that proportion determined to be necessary to produce maximum brilliancy when the final material in an unground state is subjected to said exciting radiation under the same conditions, heating said mixture to reaction but not to a temperature which will produce a sintered mass, whereby a material of somewhat less brilliancy than the maximum producible in such a material is produced, and then subjecting said material to prolonged grinding to produce a finely divided product, all of which will pass a 400 mesh screen, whereby the resulting ground material will have much greater brilliancy than a similarly ground material containing initially the smaller proportion of manganese.

6. The method of producing a finely divided luminescent material of the Willemite type comprising a matrix material and a manganese activator, for excitation when coated on a mercury discharge tube, which method comprises mixing together finely divided materials which on firing will react to produce a manganese activated orthosilicate, the proportion of manganese, calculated as the metal, being between about 2% and 2½% by weight of the matrix material, firing said materials above 1000 degrees C. for a sufficient length of time to produce a completely reacted material, crushing said material to pass a 200 mesh screen, and then grinding the crushed material until it will pass a 400-mesh screen, the proportion of manganese employed having the effect of preventing the usual loss of brilliancy in the grinding step.

SAMPSON ISENBERG.